(12) United States Patent
Takasuka et al.

(10) Patent No.: US 10,696,787 B2
(45) Date of Patent: Jun. 30, 2020

(54) LIQUID CRYSTAL POLYESTER RESIN

(71) Applicant: UENO FINE CHEMICALS INDUSTRY, LTD., Osaka-shi, Osaka (JP)

(72) Inventors: Shogo Takasuka, Sanda (JP); Hisanari Fujiwara, Kobe (JP); Tetsuya Yamashita, Kobe (JP)

(73) Assignee: UENO FINE CHEMICALS INDUSTRY, LTD., Osaka (JP)

( * ) Notice: Subject to any disclaimer, the term of this patent is extended or adjusted under 35 U.S.C. 154(b) by 96 days.

(21) Appl. No.: 16/105,240

(22) Filed: Aug. 20, 2018

(65) Prior Publication Data

US 2019/0062494 A1 Feb. 28, 2019

(30) Foreign Application Priority Data

Aug. 30, 2017 (JP) ................. 2017-165434

(51) Int. Cl.
*C08G 63/60* (2006.01)

(52) U.S. Cl.
CPC ....... *C08G 63/605* (2013.01); *C08G 2250/00* (2013.01)

(58) Field of Classification Search
CPC .......................... C08G 63/605; C08G 2250/00
USPC ........................................... 524/605
See application file for complete search history.

(56) References Cited

U.S. PATENT DOCUMENTS

2007/0010647 A1* 1/2007 Ueno ................. C08G 63/605
528/272

FOREIGN PATENT DOCUMENTS

JP 2005105232 A 4/2005

* cited by examiner

*Primary Examiner* — Hui H Chin
(74) *Attorney, Agent, or Firm* — Sughrue Mion, PLLC

(57) ABSTRACT

An object of the present invention is to provide a liquid crystal polyester resin having low-temperature processability and improved mechanical properties. The present invention relates to a liquid crystal polyester resin comprising specific repeating units and having a crystal melting temperature of less than 210° C. as measured with a differential scanning calorimeter.

17 Claims, No Drawings

LIQUID CRYSTAL POLYESTER RESIN

BACKGROUND OF THE INVENTION

1. Field of the Invention

This patent application claims priority under the Paris Convention based on Japanese Patent Application No. 2017-165434 (filed on Aug. 30, 2017), which is incorporated herein by reference in their entirety.

The present invention relates to a liquid crystal polyester resin. More specifically, it relates to a liquid crystal polyester resin having low-temperature processability and improved mechanical properties.

2. Description of the Related Art

A thermotropic liquid crystal polyester resin (hereinafter simply referred to as liquid crystal polyester resin or LCP) is excellent in terms of mechanical properties, such as heat resistance and rigidity, chemical resistance, dimensional accuracy, and the like. Therefore, in addition to molded article applications, its use has been expanding to fiber, film, and like various applications. Particularly in the information and communication fields, including personal computers and mobile phones, the development of components with higher levels of integration, reduced size, reduced thickness, reduced height, etc., has been rapidly advancing. For example, an extremely thin part having a thickness of 0.5 mm or less is often formed. Thus, taking advantage of the excellent moldability of LCP having excellent fluidity and forming no fins, which are characteristics that other resins do not have, the amount used has been significantly increasing.

Like this, liquid crystal polyester resins have various excellent characteristics. However, because of the high heat resistance, the processing temperature is significantly higher as compared with other engineering plastics such as polyethylene terephthalate, polybutylene terephthalate, and polycarbonate. Therefore, in some applications, the high processing temperature may become an obstacle.

Therefore, a liquid crystal polyester resin having improved low-temperature processability while maintaining its excellent mechanical properties, chemical resistance, and small-thickness moldability has been desired.

As a liquid crystal polyester resin having low-temperature processability, JP-A-2005-105232 (Patent Document 1) proposes a liquid crystal polyester resin composed of specific repeating units and having a melting point (crystal melting temperature) of 190 to 250° C. as measured with a differential scanning calorimeter.

The liquid crystal polyester resin disclosed in JP-A-2005-105232 has somewhat improved low-temperature processability as compared with conventional liquid crystal polyester resins. However, in recent years, the demand for a liquid crystal polyester resin having further low-temperature processability (low melting point) is getting stronger. In addition, it has been found that a liquid crystal polyester resin has the effect of modifying the physical properties of other thermoplastic resins, and the demand as a polymer alloy material is increasing.

However, in order to blend a low-melting-point thermoplastic resin having a melting point of less than 200° C., such as polypropylene or polyethylene, with a liquid crystal polyester resin, it is necessary to perform melt-kneading at a temperature equal to or higher than the melting point of the liquid crystal polyester resin, causing a problem in that other thermoplastic resins are thermally decomposed, whereby the original physical properties cannot be obtained. Under these circumstances, the development of a liquid crystal polyester resin having a reduced melting point has been strongly desired.

PRIOR ART DOCUMENTS

Patent Document 1: JP-A-2005-105232

SUMMARY OF THE INVENTION

An object of some aspects of the present invention is to provide a liquid crystal polyester resin having low-temperature processability and excellent mechanical properties.

The present inventors have conducted extensive research about the improvement of the low-temperature processability of a liquid crystal polyester resin. As a result, they have found that when monomers that provide specific repeating units are polycondensed, a liquid crystal polyester resin having a reduced crystal melting temperature and improved low-temperature processability is obtained, and thus accomplished the present invention.

That is, the present invention relates to a liquid crystal polyester resin comprising repeating units represented by the following formulae [I] to [VI] and having a crystal melting temperature of less than 210° C. as measured with a differential scanning calorimeter.

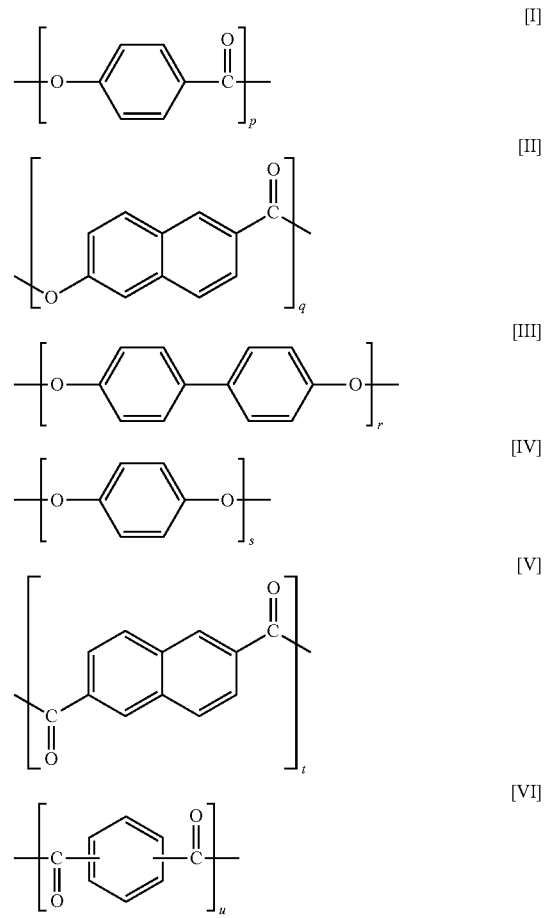

In the formulae, p, q, r, s, t, and u represent the compositional proportions (mol %) of the respective repeating units in the liquid crystal polyester resin and satisfy the following equations:

$35 \leq p \leq 55$, $25 \leq q \leq 45$, $2 \leq r \leq 15$, $0 \leq s \leq 5$, $2 \leq t \leq 15$, $0 \leq u \leq 5$, $r \geq s$, $p+q+r+s+t+u=100$.

DETAILED DESCRIPTION OF THE INVENTION

The liquid crystal polyester resin of the present invention has a crystal melting temperature of less than 210° C., and thus has improved low-temperature processability and is suitably used for applications where low-temperature processability is required or as a polymer alloy material with other thermoplastic resins.

In this Specification and Claims, "liquid crystal polyester resin" is a polyester resin that forms an anisotropic melt phase and is called "thermotropic liquid crystal polyester resin" in the technical field to which the present invention belongs.

The properties of an anisotropic melt phase can be identified by a common polarization test method utilizing crossed polarizers. More specifically, an anisotropic melt phase can be identified using a Leitz polarization microscope by observing a sample placed on the Leitz hot stage at a magnification of 40 in a nitrogen atmosphere. The liquid crystal polyester resin of the present invention shows optical anisotropy. That is, when tested between crossed polarizers, light transmits therethrough. When the sample is optically anisotropic, polarized light transmits even in a stationary state.

The liquid crystal polyester resin of the present invention indispensably contains, as repeating units, aromatic oxycarbonyl repeating units represented by formula [I] and formula [II].

In the liquid crystal polyester resin of the present invention, the compositional proportion p of the repeating unit represented by formula [I] relative to the liquid crystal polyester resin is 35 to 55 mol %, preferably 38 to 53 mol %. In addition, the compositional proportion q of the repeating unit represented by formula [II] relative to the liquid crystal polyester resin is 25 to 45 mol %, preferably 28 to 43 mol %.

In the liquid crystal polyester resin of the present invention, it is preferable that the repeating units represented by formula [I] and formula [II] satisfy the relation p>q. It is more preferable that p/q is 1.01 to 2.0, still more preferably 1.03 to 1.9, and particularly preferably 1.08 to 1.8.

Examples of monomers that provide a repeating unit represented by formula [I] include 4-hydroxybenzoic acid, as well as ester-forming derivatives thereof such as acylated products, ester derivatives, and acid halides.

Examples of monomers that provide a repeating unit represented by formula [II] include 6-hydroxy-2-naphthoic acid, as well as ester-forming derivatives thereof such as acylated products, ester derivatives, and acid halides.

In addition, the liquid crystal polyester resin of the present invention indispensably contains an aromatic dioxy repeating unit represented by formula [III]. In the liquid crystal polyester resin of the present invention, the compositional proportion r of the repeating unit represented by formula [III] relative to the liquid crystal polyester resin is 2 to 15 mol %, preferably 4 to 14 mol %.

Examples of monomers that provide a repeating unit represented by formula [III] include 4,4'-dihydroxybiphenyl, as well as ester-forming derivatives thereof such as acylated products.

The liquid crystal polyester resin of the present invention may further contain a repeating unit represented by formula [IV] as an aromatic dioxy repeating unit. In the liquid crystal polyester resin of the present invention, the compositional proportion s of the repeating unit represented by formula [IV] relative to the liquid crystal polyester resin is 0 to 5 mol %, preferably 0 to 4 mol %.

In the case where the repeating unit represented by formula [IV] is contained as an aromatic dioxy repeating unit, it is necessary that the relation r≥s is satisfied.

Examples of monomers that provide a repeating unit represented by formula [IV] include hydroquinone, as well as ester-forming derivatives thereof such as acylated products.

In addition, the liquid crystal polyester resin of the present invention indispensably contains an aromatic dicarbonyl repeating unit represented by the following formula [V]. In the liquid crystal polyester resin of the present invention, the compositional proportion t of the repeating unit represented by formula [V] relative to the liquid crystal polyester resin is 2 to 15 mol %, preferably 4 to 14 mol %.

Examples of monomers that provide a repeating unit represented by formula [V] include 2,6-naphthalenedicarboxylic acid, as well as ester-forming derivatives thereof such as ester derivatives, and acid halides.

The liquid crystal polyester resin of the present invention may further contain a repeating unit represented by formula [VI] as an aromatic dicarbonyl repeating unit. In the liquid crystal polyester resin of the present invention, the compositional proportion u of the repeating unit represented by formula [VI] relative to the liquid crystal polyester resin is 0 to 5 mol %, preferably 1 to 4 mol %.

In the case where the repeating unit represented by formula [VI] is contained as an aromatic dicarbonyl repeating unit, it is preferable that the relation t u is satisfied.

Examples of monomers that provide a repeating unit represented by formula [VI] include terephthalic acid and isophthalic acid, as well as ester-forming derivatives thereof such as ester derivatives, and acid halides. Among them, because the crystal melting temperature can be adjusted even lower, isophthalic acid is preferable.

That is, it is preferable that the repeating unit represented by formula [VI] is a repeating unit represented by the following formula [VII].

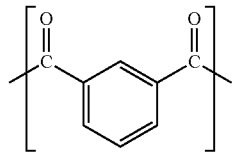

[VII]

Incidentally, in formula [I] to formula [VI], p+q+r+s+t+u=100. In addition, r+s=t+u.

As described above, the liquid crystal polyester resin of the present invention relates to a wholly aromatic liquid crystal polyester resin composed of repeating units represented by formulae [I] to [VI]. However, as long as advantages of the present invention are not impaired, monomers that provide other repeating units may also be copolymerized in addition to the main monomers that provide the repeating units represented by formulae [I] to [VI]. Examples of monomers that provide other repeating units include an aromatic hydroxycarboxylic acid, an aromatic diol, an aromatic dicarboxylic acid, an aromatic hydroxydicarboxylic acid, an aromatic hydroxylamine, an aromatic diamine, an aromatic aminocarboxylic acid, an alicyclic dicarboxylic acid, an aliphatic diol, an alicyclic diol, an aromatic mercaptocarboxylic acid, an aromatic dithiol, and an aromatic mercaptophenol. It is preferable that the amount of monomers that provide other repeating units is 10 mol % or less relative to the total amount of monomers that provide the repeating units represented by formulae [I] to [VI].

The method for producing the liquid crystal polyester resin of the present invention is not particularly limited, and a publicly-known polyester polycondensation method that forms an ester bond between the monomer components, such as a melt acidolysis method or a slurry polymerization method, is applicable.

A melt acidolysis method is a method in which monomers are first heated to form a molten solution of reactants, and then the reaction is allowed to continue to give a molten polymer. Incidentally, vacuum may be applied in order to facilitate removal of volatile matters (e.g., acetic acid, water, etc.) produced as by-products in the final stage of condensation. This method is particularly suitable in the present invention.

A slurry polymerization method is a method in which a reaction takes place in the presence of a heat exchange fluid, and a solid product is obtained as a suspension in a heat exchange medium.

Both in the melt acidolysis method and the slurry polymerization method, a polymerizable monomer component used for the production of a liquid crystal polyester resin may be subjected to the reaction in a modified form with the hydroxyl group esterified, that is, as a lower acyl ester. The lower acyl group preferably has 2 to 5 carbon atoms, more preferably 2 or 3 carbon atoms. A method in which an acetate of the monomer component is used in the reaction is particularly preferable.

As the lower acyl ester of a monomer, one that has been separately acylated and synthesized in advance may be used, or it is also possible that an acylating agent, such as acetic anhydride, is added to the monomer during the production of a liquid crystal polyester resin to produce the lower acyl ester of a monomer in the reaction system.

Both in the melt acidolysis method and the slurry polymerization method, a catalyst may be used as necessary.

Examples of catalysts include organic tin compounds such as dialkyltin oxides (e.g., dibutyltin oxide) and diaryltin oxides; organic titanium compounds such as titanium dioxide, antimony trioxide, alkoxy titanium silicates, and titanium alkoxides; alkali and alkaline earth metal salts of carboxylic acids (e.g., potassium acetate); alkali and alkaline earth metal salts of inorganic acids (e.g., potassium sulfate); and gaseous acid catalysts such as Lewis acids (e.g., $BF_3$) and hydrogen halides (e.g., HCl).

The usage percentage of the catalyst is usually 10 to 1,000 ppm, preferably 20 to 200 ppm, based on the total amount of monomers.

The liquid crystal polyester resin of the present invention obtained in this manner has a crystal melting temperature of less than 210° C. as measured with the below-described differential scanning calorimeter (DSC), and has improved processability at low temperatures. The crystal melting temperature of the liquid crystal polyester resin of the present invention is preferably 160 to 209° C., more preferably 163 to 205° C., still more preferably 165 to 199° C., and particularly preferably 170 to 189° C.

In addition, it is preferable that the liquid crystal polyester resin of the present invention has a melt viscosity of 1 to 1,000 Pa·s, more preferably 5 to 300 Pa·s, as measured with a capillary rheometer.

The present invention further provides a liquid crystal polyester resin composition obtained by incorporating one or two or more fibrous, plate-like, or powdery filler into the liquid crystal polyester resin of the present invention. The filler may be suitably selected from substances conventionally known to be used for resin compositions according to the intended use, application, and the like of the liquid crystal polyester resin composition.

Examples of fibrous fillers include glass fibers, silica alumina fibers, alumina fibers, carbon fibers, and aramid fibers. Among them, glass fibers are preferable for having an excellent balance between physical properties and cost.

Examples of plate-like or powdery fillers include talc, mica, graphite, wollastonite, calcium carbonate, dolomite, clay, glass flakes, glass beads, barium sulfate, and titanium oxide. Among them, talc is preferable for having an excellent balance between physical properties and cost.

In the liquid crystal polyester resin composition of the present invention, it is preferable that the total amount of fillers incorporated is 0.1 to 200 parts by mass, particularly 10 to 100 parts by mass, per 100 parts by mass of the liquid crystal polyester resin. In the case where the amount of fillers is more than 200 parts by mass, the molding processability of the resin composition tends to decrease, or the wear of the cylinder or mold of the molding machine tends to increase.

As long as advantages of the present invention are not impaired, the liquid crystal polyester resin composition of the present invention may further contain additives conventionally known to be used for resin compositions, including mold release improvers such as higher fatty acids, higher fatty acid esters, higher fatty acid amides, higher fatty acid metal salts, polysiloxanes, and fluororesins; colorants such as dyes and pigments; antioxidants; heat stabilizers; UV absorbers; antistatic agents; and surfactants. They may be added alone or in combination of two or more according to the intended use or the application of the resin composition.

With respect to those having effects of external lubricants, such as higher fatty acids, higher fatty acid esters, higher fatty acid metal salts, and fluorocarbon surfactants, they may be previously attached to pellets and used for molding.

The liquid crystal resin composition of the present invention may be prepared as follows. All the components, including fillers and additives, are added to a polyester resin and melt-kneaded using a Banbury mixer, a kneader, or a single-screw or twin-screw extruder at a temperature from near the crystal melting temperature of the liquid crystal polyester resin to the crystal melting temperature+100° C.

The liquid crystal polyester resin and liquid crystal polyester resin composition of the present invention thus obtained can be processed into a molded article, such as an injection-molded article, a film, a sheet, or a nonwoven fabric, by a publicly-known molding method, such as injection molding, pressing molding, extrusion molding, or blowing.

The liquid crystal polyester resin and liquid crystal polyester resin composition of the present invention are suitably used as electrical/electronic parts, machine mechanism parts such as a camera module, automotive parts, and the like. In particular, the liquid crystal polyester resin of the present invention is useful for applications where low-temperature processability is required or as a polymer alloy material with other thermoplastic resins.

EXAMPLES

Hereinafter, the present invention will be described in further detail, but the present invention is not limited thereto.

In the Examples, the below abbreviations stand for the following compounds.
POB: 4-Hydroxybenzoic acid
BONG: 6-Hydroxy-2-naphthoic acid
BP: 4,4'-Dihydroxybiphenyl
HQ: Hydroquinone
NDA: 2,6-Naphthaleneclicarboxylic acid
IPA: Isophthalic acid
TPA: Terephthalic acid <Measurement of Crystal Melting Temperature>

Measurement was performed using Exstar 6000 manufactured by Seiko Instruments Inc. A liquid crystal polyester resin sample is subjected to the measurement at a temperature rise condition of 20° C./min. from room temperature. After the endothermic peak temperature (Tm1) is observed, the sample is maintained at a temperature 20 to 50° C. higher than Tm1 for 10 minutes. Next, the sample is cooled to room temperature at a temperature fall condition of 20° C./min. and subjected to the measurement again at a temperature rise condition of 20° C./min. The endothermic peak at that time is observed, and the temperature at which the peak top appears is defined as the crystal melting temperature of the liquid crystal polyester resin.

<Bending Strength, Bending Elastic Modulus>

Using an injection molding machine having a clamping pressure of 15 t (MINIMAT M26/15 manufactured by Sumitomo Heavy Industries, Ltd.), injection molding was performed at a cylinder temperature of the crystal melting temperature+20 to 40° C. and a mold temperature of 70° C., thereby preparing a strip-shaped bending test piece (65 mm long×12.7 mm wide×2.0 mm thick). As the bending test, a three-point bending test was performed using INSTRON5567 (universal tester manufactured by Instron Japan Company Limited) at a span distance of 40.0 mm and a compression rate of 1.3 mm/min.

Example 1

Into a reaction vessel including a torquemeter-equipped stirring device and a distillation tube, POB, BONG, BP, NDA, and TPA were charged in the compositional proportions shown in Table 1 to a total amount of 6.5 mol. Further, 1.03-fold molar excess of acetic anhydride relative to the total amount of hydroxyl groups in the monomers (mol) was charged, and deacetation polymerization was performed under the following conditions.

In a nitrogen gas atmosphere, the temperature was raised from room temperature to 150° C. over 1 hour and maintained at the same temperature for 30 minutes. Next, while distilling off acetic acid produced as a by-product, the temperature was quickly raised to 210° C. and maintained at the same temperature for 30 minutes. Subsequently, the temperature was raised to 340° C. over 4 hours, and then the pressure was reduced to 10 mmHg over 80 minutes. The polymerization reaction was completed at the time when a predetermined torque was shown, then the reaction vessel content was taken out, and, using a grinder, pellets of a liquid crystal polyester resin were obtained. The distillation amount of acetic acid at the time of polymerization was nearly the theoretical value.

The crystal melting temperature of the obtained liquid crystal polyester resin measured by DSC was 183° C., indicating improved low-temperature processability.

In addition, the values of bending strength and bending elastic modulus were also high, indicating excellent mechanical properties.

Example 2 to Example 5

Liquid crystal polyester resin pellets were obtained in the same manner as in Example 1, except that the monomer compositional proportions were changed as shown in Table 1. The distillation amount of acetic acid at the time of polymerization was nearly the theoretical value.

The crystal melting temperatures, the bending strengths, and the bending elastic moduli of the obtained liquid crystal polyester resins are shown in Table 1.

Comparative Example 1 to Comparative Example 4

Liquid crystal polyester resin pellets were obtained in the same manner as in Example 1, except that the monomer compositional proportions were changed as shown in Table 1. The distillation amount of acetic acid at the time of polymerization was nearly the theoretical value.

The crystal melting temperatures, the bending strengths, and the bending elastic moduli of the obtained liquid crystal polyester resins are shown in Table 1.

TABLE 1

|  |  | POB | BON6 | BP | HQ | NDA | IPA | TPA | Crystal Melting Temperature (° C.) | Bending Strength (MPa) | Bending Elastic Modulus (GPa) |
|---|---|---|---|---|---|---|---|---|---|---|---|
| Example 1 | Mass (g) | 403.9 | 428.2 | 121.0 | — | 112.4 | 21.6 | — | 183 | 149 | 11.0 |
|  | mol % | 45 | 35 | 10 | — | 8 | 2 | — |  |  |  |
| Example 2 | Mass (g) | 448.8 | 489.3 | 60.5 | — | 42.2 | 21.6 | — | 198 | 161 | 12.0 |
|  | mol % | 50 | 40 | 5 | — | 3 | 2 | — |  |  |  |
| Example 3 | Mass (g) | 403.9 | 428.2 | 72.6 | 28.6 | 84.3 | — | 43.2 | 197 | 164 | 12.3 |
|  | mol % | 45 | 35 | 6 | 4 | 6 | — | 4 |  |  |  |
| Example 4 | Mass (g) | 403.9 | 428.2 | 72.6 | 28.6 | 89.9 | 21.6 | 17.3 | 187 | 164 | 12.3 |
|  | mol % | 45 | 35 | 6 | 4 | 6 | 2 | 2 |  |  |  |

TABLE 1-continued

|  |  | POB | BON6 | BP | HQ | NDA | IPA | TPA | Crystal Melting Temperature (° C.) | Bending Strength (MPa) | Bending Elastic Modulus (GPa) |
|---|---|---|---|---|---|---|---|---|---|---|---|
| Example 5 | Mass (g) | 341.1 | 342.5 | 157.3 | 28.6 | 196.7 | 21.6 | 10.8 | 185 | 165 | 12.4 |
|  | mol % | 38 | 28 | 13 | 4 | 14 | 2 | 1 |  |  |  |
| Comparative | Mass (g) | 359.1 | 489.3 | — | 71.6 | — | — | 108.0 | 218 | 159 | 11.6 |
| Example 1 | mol % | 40 | 40 | — | 10 | — | — | 10 |  |  |  |
| Comparative | Mass (g) | 314.2 | 305.8 | 242.6 | — | 253.0 | 21.6 | — | 217 | 142 | 10.5 |
| Example 2 | mol % | 35 | 25 | 20 | — | 18 | 2 | — |  |  |  |
| Comparative | Mass (g) | 260.3 | 623.9 | — | 71.6 | — | — | 108.0 | 228 | 171 | 12.4 |
| Example 3 | mol % | 29 | 51 | — | 10 | — | — | 10 |  |  |  |
| Comparative | Mass (g) | 412.9 | 489.3 | 36.3 | 28.6 | 98.4 | — | — | 218 | 150 | 10.7 |
| Example 4 | mol % | 46 | 40 | 3 | 4 | 7 | — | — |  |  |  |

What is claimed is:

1. A liquid crystal polyester resin comprising repeating units represented by the following formulae [I] to [VI] and having a crystal melting temperature of 189° C. or less as measured with a differential scanning calorimeter:

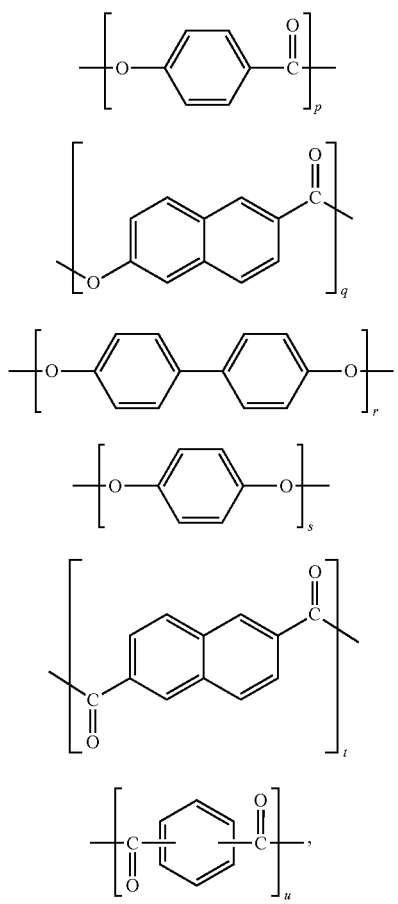

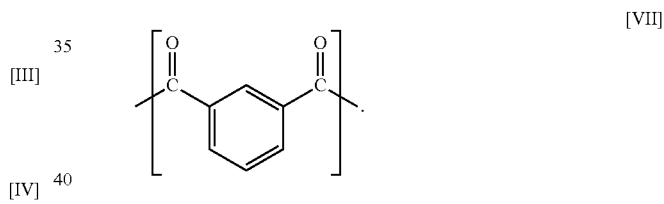

wherein p, q, r, s, t, and u represent the compositional proportions (mol %) of the respective repeating units in the liquid crystal polyester resin and satisfy the following equations:

$35 \leq p \leq 55$, $25 \leq q \leq 45$, $2 \leq r \leq 15$, $0 \leq s \leq 5$, $2 \leq t \leq 15$, $0 \leq u \leq 5$, $r \geq s$, $p+q+r+s+t+u=100$.

2. The liquid crystal polyester resin according to claim 1, wherein the repeating unit represented by formula [VI] is a repeating unit represented by formula [VII]:

[VII]

3. The liquid crystal polyester resin according to claim 1, further satisfying p>q.

4. The liquid crystal polyester resin according to claim 2, further satisfying p>q.

5. A liquid crystal polyester resin composition comprising 0.1 to 200 parts by mass of one or two or more of fibrous, plate-like, or powdery filler per 100 parts by mass of the liquid crystal polyester resin according to claim 1.

6. A liquid crystal polyester resin composition comprising 0.1 to 200 parts by mass of one or two or more of fibrous, plate-like, or powdery filler per 100 parts by mass of the liquid crystal polyester resin according to claim 2.

7. A liquid crystal polyester resin composition comprising 0.1 to 200 parts by mass of one or two or more of fibrous, plate-like, or powdery filler per 100 parts by mass of the liquid crystal polyester resin according to claim 3.

8. A liquid crystal polyester resin composition comprising 0.1 to 200 parts by mass of one or two or more of fibrous, plate-like, or powdery filler per 100 parts by mass of the liquid crystal polyester resin according to claim 4.

9. A molded article comprising the liquid crystal polyester resin according to claim 1.

10. A molded article comprising the liquid crystal polyester resin according to claim 2.

11. A molded article comprising the liquid crystal polyester resin according to claim 3.

12. A molded article comprising the liquid crystal polyester resin according to claim 4.

13. A molded article comprising the liquid crystal polyester resin composition according to claim 5.

14. A molded article comprising the liquid crystal polyester resin composition according to claim 6.

15. A molded article comprising the liquid crystal polyester resin composition according to claim 7.

16. A molded article comprising the liquid crystal polyester resin composition according to claim 8.

17. The liquid crystal polyester resin according to claim 1, wherein the crystal melting temperature is 160° C. to 189° C.

* * * * *